United States Patent [19]

Martin et al.

[11] Patent Number: 4,618,864
[45] Date of Patent: Oct. 21, 1986

[54] RADAR CHANNEL INCLUDING AN ORTHOGONAL MTI FILTER PAIR

[75] Inventors: Raymond G. Martin, Ellicott City; James H. Mims, Millersville, both of Md.

[73] Assignee: Westinghouse Electric Corp., Pittsburgh, Pa.

[21] Appl. No.: 575,642

[22] Filed: Jan. 31, 1984

[51] Int. Cl.$^4$ .............................................. G01S 13/52
[52] U.S. Cl. .................................................. 342/162
[58] Field of Search ................. 343/7.7, 5 NQ, 5 DP, 343/5 FT, 5 SW, 18 E

[56] References Cited

U.S. PATENT DOCUMENTS

| | | | |
|---|---|---|---|
| 3,797,016 | 3/1974 | Martin | 343/7.7 |
| 4,318,099 | 3/1982 | Hsiao | 343/5 SW |
| 4,339,754 | 7/1982 | Hammers et al. | 343/7.7 |
| 4,489,392 | 12/1984 | Lewis | 343/7.7 X |
| 4,573,052 | 2/1986 | Guillerot et al. | 343/18 E |

OTHER PUBLICATIONS

"Radar Handbook", by M. I. Skolnik; p. 35-3; McGraw-Hill, N.Y., 1970.
"IEEE Transactions on Audio and Electro-Acoustics" (Sep. 1968); pp. 307-308.
M. Skolnik, *Intro. to Radar Systems*, (McGraw-Hill, 1980), p. 110.

*Primary Examiner*—Thomas H. Tarcza
*Assistant Examiner*—Bernarr Earl Gregory
*Attorney, Agent, or Firm*—W. E. Zitelli

[57] ABSTRACT

In a radar operating in a moving target indication (MTI) mode with frequency diversity by transmitting N+1 pulse bursts and receiving echo signalling therefrom, a radar channel is included for doppler processing the received N+1 pulse echo signal bursts. Each pulse of the same burst envelopes a fixed carrier frequency. The radar is operative to change the transmitted carrier frequency from one pulse burst to another. The radar channel comprises an MTI filter operative as two different orthogonal MTI filters, each having a frequency response similar to an N-pulse MTI filter, to process functionally in parallel a received N+1 pulse echo signal burst to generate a filter signal from each functional filter. Also included is apparatus for combining the two filter signals non-coherently to generate a composite signal corresponding to the N+1 pulse echo signal burst for target detection. The radar channel is operative to process N+1 pulse bursts with either fixed or variable interpulse periods. The two functionally operative filters have frequency response characteristics substantially similar to each other for target echo signals, but effect uncorrelated noise output signals corresponding to a common N+1 pulse echo signal burst.

18 Claims, 9 Drawing Figures

RADAR CHANNEL INCLUDING AN ORTHOGONAL MTI FILTER PAIR

BACKGROUND OF THE INVENTION

The present invention relates to moving target indication (MTI) radars, in general, and more particularly to a radar channel including two different orthogonal MTI filters operating functionally in parallel with substantially similar target signal response characteristics, except that their noise outputs are uncorrelated for a post detection integration thereof.

Figure 1:
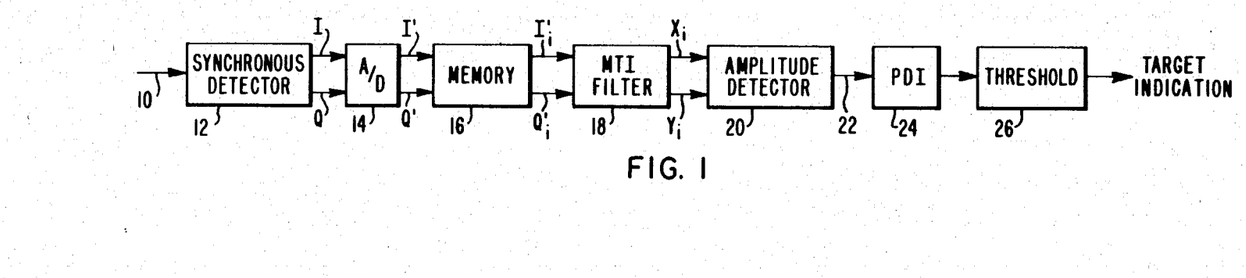
FIG. 1 is a block diagram schematic exemplifying a typical MTI radar channel embodiment.

An MTI radar channel is exemplified in the block diagram schematic embodiment depicted in FIG. 1. Typically, received echo signalling of the radar is conditioned into intermediate frequency (IF) or video signalling 10 and provided to a conventional synchronous detector 12 wherein it is separated into its in-phase (I) and quadrature (Q) component signals. In most modern radars, the I and Q component signals are digitized by a sampling analog-to-digital (A/D) converter 14 to provide sampled-data I' and Q' component signals which are temporarily stored in a memory 16. The memory 16 operates in conjunction with an MTI filter 18, which may be an N-pulse canceler, for example, to process signals $I'_i$ and $Q'_i$ in accordance with a common range cell i.

The primary purpose of the MTI filter 18 is to effect substantial notch rejection of doppler frequencies about zero frequency, the pulse repetition frequency (PRF), and harmonics thereof. The desired notch rejection characteristics of the filter 18 generally are a function of the number of radar pulses the filter is operating on concurrently. Practically, the MTI filter 18 may be designed for two-, three-, or four-pulse canceller operation under which conditions, the filter 18 is operating concurrently on two-pulses, three-pulses, or four-pulses, respectively, of the stream of echo pulses received by the radar. Thus, once receiving its requisite number of pulses under an initialization phase, the filter 18 operating in conjunction with the memory 16 generates real $X_i$ and imaginary $Y_i$ pulsed signalling for each new echo pulse received and conditioned by the radar. The signals $X_i$ and $Y_i$ are coherent doppler frequency signals within the pass band of the filter 18 resulting from a common range cell i.

A conventional amplitude detector 20 may be included in the radar channel to derive the amplitudes of the coherent signalling $X_i$ and $Y_i$ and provide this sequence of amplitudes via signal line 22 to a post detection integration (PDI) circuit 24 for the non-coherent integration thereof. Generally, the integration process of the circuit 24 may be conducted in accordance with a well-known "sliding-window" technique. The resulting stream of integrated pulsed signalling may be compared with a threshold level in a conventional threshold circuit 26 for the purposes of target identification. Ordinarily, the pulsed signalling exceeding the threshold level is an indication of a target and not extraneous noise. In effect then, the MTI filter 18 is provided to eliminate clutter such as surrounding terrain, rain, chaff, slow-moving clouds and the like; and wherein the PDI circuit 24 is provided to improve the signal-to-noise (S/N) echo signalling passed by the MTI filter 18 and thus provide for better sensitivity in the threshold circuit 26 for detecting actual targets.

Detectability in a typical radar MTI channel, which may be averaged for example over all target radial speeds as represented by the measured doppler frequency thereof, is generally lower than that in a corresponding non-MTI or normal channel, even when there is no significant clutter interference present. This is because the MTI filter 18 produces correlation in the thermal noise component of its outputs $X_i$ and $Y_i$, resulting in a lower pulse detection integration grain. For example, when there is no target present, only noise is present in the interpulse echo signalling pulse-to-pulse which limits sensitivity inherently. That is, a large pulse noise signal will be processed by the N-pulse canceller 18 for the interval of N-pulses due to the correlative operations of the MTI filter, i.e. a piece of noise data input to the filter will stay in the filter for the number of pulses corresponding to the order of the canceller and thus contribute to the sum output over the length of time associated therewith, as weighted by the different tap weight factors at each node of the filter it passes. The effect of this operation is to make the noise contribution of the output signals $X_i$ and $Y_i$ correlated from pulse-to-pulse for the number of pulses corresponding to the order of the canceller. In contrast, in non-MTI channels, the noise signalling is statistically independent from pulse-to-pulse rendering no correlation thereof.

The threshold level of the threshold circuit 26 is normally selected to maintain a constant false alarm rate in the absence of a target echo signal. In determining the false alarm characteristics of the threshold circuit 26, one must take into account whether or not a correlation process is present in the radar channel. When a heavy correlation is present in the MTI filter 18, for example, for a given false alarm behavior of the radar, the threshold level of the threshold circuit 26 is set higher than in the case in which there is no noise correlation. With a higher setting of the threshold level, the threshold circuit 26 is less able to detect a target echo signal because the signal has to be stronger to cross the higher threshold than in an uncorrelated noise process. For this reason, there is loss in detectability associated with the MTI filter basically because the threshold level in the threshold circuit 26 is raised in order to maintain the desired constant false alarm rate which makes the radar less sensitive with regard to target detection.

The MTI radar channel loss is particularly severe in a frequency diversity radar operating in a pulse burst MTI mode. Such a radar may transmit N pulses, where N may be on the order of four, for example, at a single carrier frequency and process the return echo signalling through an N-pulse MTI canceller such as that shown in the radar channel of FIG. 1, thus producing only a single output pulse for detection in the threshold circuit 26 downstream, prior to changing the carrier frequency and repeating the burst process. In this case, no PDI is possible in the MTI channel, whereas, in a corresponding normal channel, PDI of N-pulses can be accomplished. Thus, there is even a more significant loss penalty for the frequency diversity operation, i.e. one pulse output for each N-pulse burst, wherein the PDI 24 can no longer perform its sliding window, non-coherent integration.

It has been proposed to obtain two pulses out of an N-pulse canceller filter with an N+1 pulse burst and integrate the two pulses non-coherently in an attempt to get approximately 3 db (i.e. 2:1) improvement over the present loss in detectability. In reality, this proposal does not afford such an improvement because the noise from pulse-to-pulse is heavily correlated in the processing of the N-pulse canceller filter in which case it does not do any good to add up the two successive pulses generated therefrom. For example, for a burst of five pulses in a frequency diversity operation, a four-pulse canceller generates two successive pulses for each burst of different frequency. However, the integration of the two successive pulses doesn't provide any significant detection performance benefits because of the noise correlation of the MTI channel processing.

What apparently is needed especially with regard to the frequency diversity operational mode of the radar is an MTI radar channel structure and operation which provides uncorrelated noise outputs which may be combined non-coherently in order to provide significant detection performance benefits without alternating substantially the notch rejection frequency response of the MTI filter characteristics.

SUMMARY OF THE INVENTION

A radar operates in a moving target indication (MTI) mode with frequency diversity by transmitting $N+1$ pulse bursts and receiving echo signalling therefrom. Each pulse of the same burst envelopes a fixed carrier frequency. The radar is operative to change the transmitted carrier frequency from one pulse burst to another. The radar includes a radar channel for doppler processing the received $N+1$ pulse echo signal bursts.

In accordance with the present invention, the radar channel comprises filtering means operative as two different orthogonal MTI filters to process functionally in parallel a received $N+1$ pulse echo signal burst to generate a filter signal from each functional filter, and means for combining the two signals non-coherently to generate a composite signal corresponding to the $N+1$ pulse echo signal burst for target detection. Each MTI filter has a frequency response similar to an N-pulse MTI filter. In one embodiment, the filtering means includes two functionally operative $N+1$ pulse weighted cancellor filters, each operative with a frequency response characteristic similar to an N-pulse weighted cancellor filter. The filters have frequency response characteristics substantially similar to each other for target echo signals, but which effect uncorrelated noise output signals corresponding to a common $N+1$ pulse echo signal burst. Each functionally operative $N+1$ pulse weighted cancellor filter includes a set of tap weights having values which effect the uncorrelated noise outputs of the two filters. The filtering means may include two MTI filters operative in parallel to process an $N+1$ pulse echo signal burst, or one MTI filter operative in a time-shared fashion between two different orthogonal MTI filter characteristics manifesting the effects of a parallel operation of the two filters to process an $N+1$ pulse echo signal burst.

The radar may be operative to transmit an $N+1$ pulse burst with either a fixed pulse repetition rate or with variable interpulse periods. Each of the two different $N+1$ pulse weighted cancellors has a sampled-data signal response including one non-zero valued Z-transform zero with corresponding non-zero values of the two cancellors being different valued. In addition, each cancellor is operative with a set of filter tap weights which are non-identical to the other cancellors set.

DESCRIPTION OF THE PREFERRED EMBODIMENT

Figure 2:
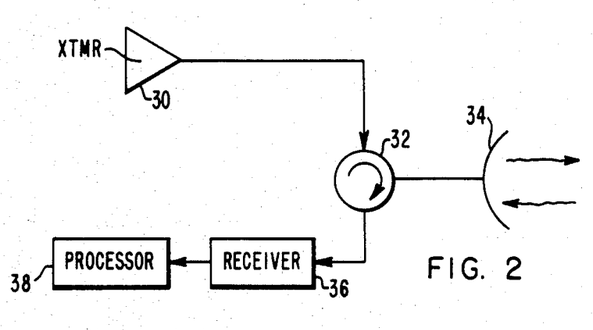
FIG. 2 is a block diagram schematic of a typical radar operating in an MTI mode with frequency diversity and suitable for embodying the present invention.
Figure 3A:
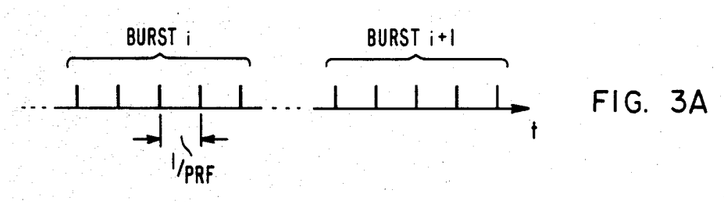
FIGS. 3A and 3B depict pulse burst waveforms with fixed and variable interpulse periods, respectively.
Figure 3B:
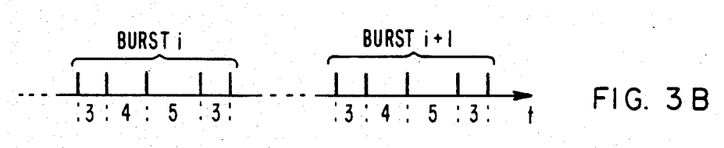

A typically radar operating in a moving target indicator (MTI) mode with frequency diversity is depicted by the block diagram schematic embodiment of FIG. 2. Referring to FIG. 2, the MTI radar includes a transmitter 30 for transmitting pulse bursts via a conventional circulator 32 and antenna system 34 into a spatial region designated by the beam of the antenna system 34. Moreover, a radar receiver 36 operates to receive the echo signalling from the pulse burst transmissions being reflected from targets or other objects in the path of the radar beam. Examples of the pulse bursts are shown by the waveforms 3A and 3B in FIG. 3. Each pulse of the same burst i or i+1, for example, envelopes a fixed carrier frequency. The radar is operative to change the transmitted carrier frequency from one pulse burst i to another i+1. The pulse burst may either be transmitted with a fixed pulse repetition frequency (PRF) as shown in the waveform 3A or with a variable interpulse period like that exemplified in the waveform 3B, the interpulse period ratio of which being 3:4:5:3. Note that the waveforms 3A and 3B exemplify five-pulse burst in each case. The radar may further include a doppler processor 38 for operating on each pulse echo signal burst conditioned by the front end receiver 36 to detect a moving target.

Included in the processor 38 is an MTI radar channel similar to the one described in connection with the embodiment of FIG. 1 except that the MTI filtering function has been altered to effect a more useful PDI gain especially when the radar is operating in the pulse burst MTI mode. It is understood that when operating in a pulse burst mode, a conventional MTI filter includes particular notch rejection characteristics in the frequency response thereof about zero frequency, the pulse repetition frequency, and harmonics thereof. The notch characteristics of the filter response are generally designed with respect to the number of pulses N transmitted in the pulse burst of the radar to achieve the clutter rejection desired.

For example, the MTI filter 18 may an N-weighted pulse canceller, like a transversal filter with N tap weights. If the radar is transmitting four-pulse bursts, then the transversal filter will include four tap weights and three z-transform zeros which may be set at or near zero frequency value. The values given to the tap weights and the setting of the z-transform zeros characterize the MTI filter response including the notch rejection characteristics. However, as described hereabove in the background section, a conventional MTI filter produces only one pulse output per pulse burst in the frequency diversity mode for target detection, prior to changing the carrier frequency and repeating the process. In this case, no pulse detection integration is possible in the MTI channel.

As further indicated hereinabove, it has been proposed to increase the number of pulses transmitted in each burst to permit more pulses to be produced by the conventional MTI filter. However, as pointed out, the MTI filter strongly correlates the noise component of its output resulting in lower pulse detection integration gain. Thus, it is the intention of the present invention to increase the number of pulses transmitted in each pulse burst, say from N to N+1 and provide a useful PDI gain. It is further proposed that while achieving the desired aforementioned feature, the notch rejection characteristic of the frequency response of the N-pulse canceller filter will be substantially maintained.

In accordance with the broad principles of the present invention, a radar channel for doppler processing the received N+1 pulse echo signal bursts comprises filtering means operative as two different orthogonal MTI filters, each having a frequency response similar to an N-pulse MTI filter, to process functionally in parallel a received N+1 pulse echo signal burst to generate two filter signals therefrom, and means for combining the two filter signals non-coherently to generate a composite signal corresponding to the N+1 pulse echo signal burst for target detection. The two different orthogonal MTI filters are shown in the functional block diagram schematic of FIG. 4 at 40 and 42. The filters 40 and 42 process the pulse echo signal burst data $I'_i$ and $Q'_i$ accessed from the memory 16 in accordance with the range cell i. The two functionally operative filters have frequency response characteristics substantially similar to each other but effect uncorrelated noise components of their corresponding complex output signals $X_{1i}+jY_{1i}$ and $X_{2i}+jY_{2i}$ corresponding to a common N+1 pulse echo signal burst.

Figure 4:
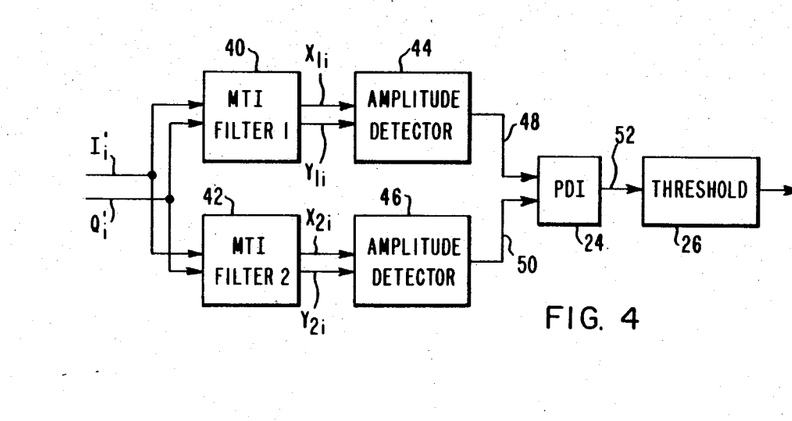
FIG. 4 is a block diagram schematic of a portion of a radar channel suitable for embodying the principles of the present invention.

The complex output signals of the filters 40 and 42 are provided to amplitude detectors 44 and 46 which are operative to generate an amplitude signal over signal lines 48 and 50 in each case. The two amplitude signals generated by the amplitude detectors 48 and 46 corresponding to an N+1 pulse burst may be combined non-coherently in the post detection integrator 24 to generate a composite signal over signal line 52 for target detection in the threshold circuit 26.

Thus, the radar is operative to transmit a sequence of N+1 rather than N pulses, to process them through two functionally parallel, orthogonal MTI filters 40 and 42, and in conjunction with the respective amplitude detectors 44 and 46, to non-coherently integrate the two filter outputs in the post detection integrator 24. It is expected that the gain and detectability achieved by this process will more than offset the increase in transmitted energy (i.e. increasing number of pulses by 1 in the pulse bursts), typically by approximately 1 dB for a four-pulse canceller case. In addition, by proper selection of the filter tap weights, the velocity (frequency) responses of the two orthogonal MTI filters 40 and 42 may be made identical to each other for fixed PRF operation, and closely identical if not identical for the variable interpulse period operation. A modest loss (e.g. 6 dB) in MTI improvement factor may be suffered, but the loss is offset by a somewhat flatter velocity (frequency) response.

More specifically, an orthogonal pair of MTI filters may be defined as two filters that, when driven by a common, stationary, white noise source, for example, produce uncorrelated noise outputs. Thus, if the filter weights are denoted as $W_k$ and $V_k$, respectively, for $k=1, 2, \ldots, N$ and the input noise voltages are denoted as $e_k$, the noise output signals may be mathematically expressed as:

$$S_1 = \sum_{k=1}^{N} W_k e_k, \text{ and} \tag{1}$$

$$S_2 = \sum_{k=1}^{N} V_k e_k. \tag{2}$$

The required condition, that $S_1$ and $S_2$ be uncorrelated, is that $$E[S_1 S^*_2] = 0, \tag{3}$$

where the * indicates complex conjugation and E signifies an expected value. Equivalently, $$E\left\{ \left( \sum_{k=1}^{N} W_k e_k \right) \left( \sum_{j=1}^{N} V_j^* e_j^* \right) \right\} = 0, \tag{4}$$

which may be written as $$\sum_{k=1}^{N} \sum_{j=1}^{N} [W_k V_j^* E\{e_k e_j^*\}] = 0. \tag{5}$$

Because of the stationary, white noise character of the input noise signals, it is noted that $$E\{e_k e_j^*\} = \begin{cases} \sigma^2, j = k \\ 0, j = k \end{cases} \tag{6}$$

where $\sigma^2$ is the input noise power and equation (5) is equivalent to $$\sigma^2 \sum_{k=1}^{N} W_k V_k^* = 0. \tag{7}$$

Since $\sigma^2$ is assumed to be non-zero, the required condition for orthogonality of the two MTI filters is:

$$\sum_{k=1}^{N} W_k V_k^* = 0. \tag{8}$$

Fixed PRF Filters

In describing the MTI filter pair for a fixed PRF rate of operation, the case of a four-pulse burst will be considered in which case, conventionally, the MTI filter may be a four-pulse binomial weighted canceller which may have its three Z-transform zeros set at zero frequency.

Thus, by increasing the number of pulses in each burst by one, i.e., to five pulses per burst, for example, each filter 40 and 42 will accommodate the five pulses with five tap weights and accordingly will have four Z-transform zeros in its frequency response. If three of the Z-transform zeros are set at zero frequency in each filter 40 and 42, one Z-transform zero is left undetermined in each filter 40 and 42 which adds an additional degree of freedom for uncorrelating the noise outputs of the filter pair. Since the orthogonality condition of equation (8) precludes the two filters having identical weights, the undetermined Z-transform zeros of the two filters are different from each other. Mathematically, the responses of the two filters may be respectively expressed in terms of their Z-transforms as follows:

$$H_1(z) = (z-1)^3(z-z_1), \text{ and} \tag{9}$$

$$H_2(z) = (z-1)^3(z-z_2), \tag{10}$$

where $z_1$ and $z_2$ are the undetermined Z-transform zeros in the filter responses. Expanding the above equations (9) and (10), the following Z-transformations of the filter signal responses are obtained:

$$H_1(z) = z^4 - (3+z_1)z^3 + 3(z_1+1)z^2 - (3z_1+1)z + z_1, \text{ and} \tag{11}$$

$$H_2(z) = z^4 - (3+z_2)z^3 + 3(z_2+1)z^2 - (3z_2+1)z + z_2, \tag{12}$$

where the coefficients of the various powers of z are the filter tap weights of the corresponding MTI filters 40 and 42. Substituting these tap weights into the orthogonality equation (8) yields:

$$4 + 3z_1 + 3z_2^* + 4z_1 z_2^* = 0. \tag{13}$$

An additional relationship between $z_1$ and $z_2$ may be provided from a desired condition that the signal responses of the two MTI filters be closely similar. This condition may be imposed by setting the power responses thereof, normalized with respect to their noise power gains, identical at one-half the PRF. Fortuitously, this additional condition also results in the aforementioned normalized responses being identical at all frequencies which will be shown herebelow.

Normalizing the above equations (11) and (12) with their corresponding noise power gains yields the following expressions:

$$G_1 = \frac{|1 + (3+z_1) + 3(z_1+1) + 3z_1 + 1) + z_1|^2}{1 + |3+z_1|^2 + 9|z_1+1|^2 + |3z_1+1|^2 + z_1^2}, \text{ and} \tag{14}$$

$$G_2 = \frac{|1 + (3+z_2) + 3(z_2+1) + 3z_2 + 1) + z_1|^2}{1 + |3+z_2|^2 + 9|z_2+1|^2 + |3z_2+1|^2 + z_2^2}, \text{ and} \tag{15}$$

If real solutions are first sought for the filter tap weights, the complex conjugates in the orthogonality equation of (8) may initially be ignored and the squared absolute values may be replaced with simple squares in the above equations (14) and (15). which then become respectively:

$$4 + 3z_1 + 3z_2 + 4z_1 Z_2 = 0, \tag{16}$$

$$G_1 = \frac{32(1+z_1)^2}{5(2z_1^2 + 3z_1 + 2)}, \text{ and} \tag{17}$$

$$G_2 = \frac{32(1+z_2)^2}{5(2z_2^2 + 3z_1 + 2)}. \tag{18}$$

Setting $G_1$ equal to $G_2$ from the above equations (17) and (18) yields, after some manipulation, the quadratic relationship:

$$z_2 z_1^2 - (1+z_2^2)z_1 + z_2 = 0, \tag{19}$$

which may be solved for $z_1$ in terms of $z_2$ as follows:

$$z_1 = z_2, 1/z_2, \tag{20}$$

the solution $z_1 = 1/z_2$ appears to be the only practical solution of interest and is substituted into the orthonality equation of (16) to yield the one zero value $z_1$ as a function of the other zero value $z_2$ as follows:

$$z_1 = -\frac{(3z_2 + 4)}{(4z_2 + 3)}, \tag{21}$$

substituting the above result in equation (17) provides $G_1$ as a function of the zero value $z_2$ as follows:

$$G_1 = \frac{32(z_2 - 1)^2}{35(2z_2^2 + 3z_2 + 2)}, \text{ and} \tag{22}$$

equating the above expression for $G_1$ to the expression for $G_2$ in equation (18) as follows:

$$\frac{(1+z_2)^2}{(2z_2^2 + 3z_2 + 2)} = \frac{(z_2 - 1)^2}{7(2z_2^2 + 3z_2 + 2)}, \tag{23}$$

yields either $$2z_2^2 + 3z_2 + 2 = 0, \text{ or} \tag{24}$$

$$7(1+z_2)^2 = (z_2 - 1)^2. \tag{25}$$

Solving the quadratic equation (25) yields $$z_2 = (-4 \pm \sqrt{7})/3 \tag{26}$$

and as previously noted $$z_1 = 1/z_2. \tag{27}$$

The two solutions for $z_2$ are, in fact, mutually reciprocal. Hence, in accordance with equation (27), one of the solutions may be regarded as $z_1$ and the other as $z_2$. The corresponding tap filter weights, as determined from the equations (11) and (12), and normalized to provide unity noise gain are exemplified as:

| | |
|---|---|
| $W_1 = 0.30812$ | $V_1 = -0.13909$ |
| $W_2 = -0.78528$ | $V_2 = 0.10914$ |
| $W_3 = 0.50708$ | $V_3 = 0.50708$ |
| $W_4 = 0.10914$ | $V_4 = -0.78528$ |
| $W_5 = -0.13909$ | $V_5 = 0.30812$ |

Figure 5:
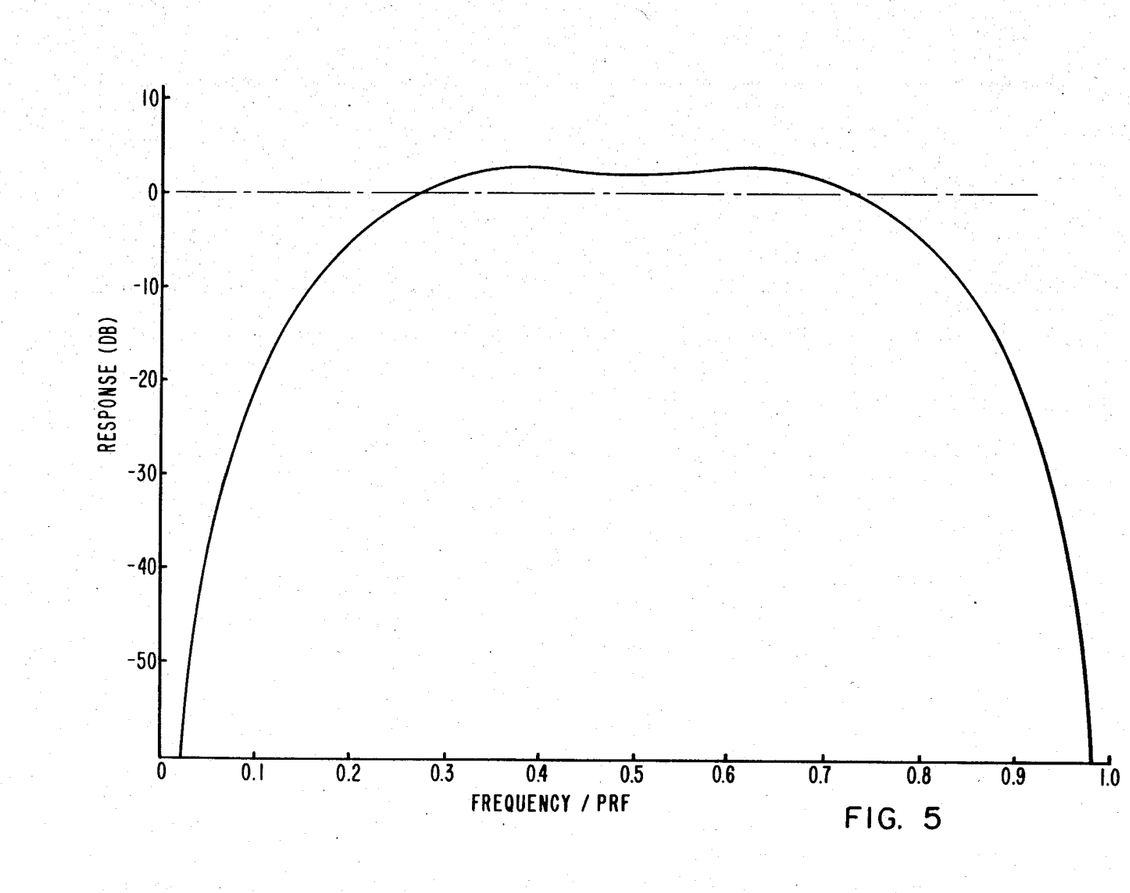
FIG. 5 is a graph of the power response of a five-pulse weighted cancellor which embodies the principles of the present invention for pulse bursts with fixed interpulse periods.

Since the set of filter tap weights $V_k$ is seen to be equal to the weights $W_k$ in reverse order, it is apparent that their power responses are equal at all frequencies. The graph of FIG. 5 depicts this response. As previously noted, the power response as shown in FIG. 5 for a five-pulse canceller has a passband which is flatter than that of a binomial weighted four-pulse canceller.

Returning to the alternative solution of equation (20), that is, $z_1=z_2$, and solving for $z_2$ in accordance with the foregoing procedure yields:

$$z_2 = (-3 \pm j\sqrt{7})/4.$$

These two solutions are also mutually reciprocal, or equivalently $z_2$ lies on the unit circle in the z-plane. Thus, it is again possible to regard one solution as $z_1$ and the other as $z_2$. Since both are complex, the assumptions made in deriving the above equations (16), (17) and (18) are not strictly valid. Nevertheless, substitution of either of these roots into equations (11) and (12) produces equal weight sets of $V_k$ and $W_k$, complex in this case, which meet the required orthogonality conditions of equation (13) if one set of filter tap weights is replaced by a complex conjugate of the other set of filter tap weights. In this case, their power responses are non-symmetrical, and are mirror images of each other. Thus, they meet the condition of equality only at half the PRF. Additionally, since both $z_1$ and $z_2$ lie on the unit circle of the z-plane, the responses have complete nulls, that occur at approximately ±0.38 times the PRF.

It is understood that while the foregoing analysis has been carried out for the orthogonal filter pairs having frequency responses similar to a four-pulse canceller, the principles of applicants' invention should not be so limited, but rather similar analysis may be applied to orthogonal filter pairs having responses equivalent to two- or three-pulse cancellers, or even more general canceller filters having N specifically defined Z-transform zero locations, not necessarily all at zero frequency, as in the above example.

Variable Interpulse Period Filters

The foregoing inventive concept of the pair of different MTI filters may be extended to the case of variable interpulse period radar operation as described in connection with the waveform 3B. One technique for designing a filter pair for this purpose is exemplified in the following description. Again, a four-pulse canceller filter response case will be used for descriptive purposes, although it is clearly understood that the inventive concept may be applied to the more general N-pulse cases.

Accordingly, it is assumed that the radar transmits five pulse bursts, the five pulses in each case having interpulse times $T_k$, for $k=1-5$, not necessarily equally spaced in time, and that the desired orthogonal MTI filters have three predetermined frequency response zeros each. In practice, especially to maximize the MTI improvement factor for a given antenna scan modulation, it is often convenient to place one frequency response zero at zero frequency and the other two at $\pm\phi$, where $\phi$ is a small fraction (e.g. 0.05) of the reciprocal of the average interpulse period. These conditions will also be assumed for the particular case being considered.

In the present example for the variable interpulse period operation, the signal responses of the two orthogonal MTI filters may not, in general, match at all frequencies (unless the VIP sequence is symmetric), hence, it is convenient to equalize them for computational purposes in the region of the rejection notches of the filter responses, and a reasonable choice for this region is at $2\phi$, for example. However, it is understood that this specific choice implies no general limitation or restriction thereof.

For the reasons that it is desirable to allow arbitrary interpulse period ratios in the VIP sequence of the radar, it is no longer convenient to employ the Z-transform analysis used in the fixed PRF analysis described hereabove, thus, a more general time-domain approach will be used. Consequently, the condition that the filters have the specified frequency response zeros may be written as:

$$\sum_{k=1}^{N} W_k = 0, \tag{29}$$

$$\sum_{k=1}^{N} W_k \cos 2\pi\phi T_k = 0, \tag{30}$$

$$\sum_{k=1}^{N} W_k \sin 2\pi\phi T_k = 0, \tag{31}$$

with three corresponding equations in $V_k$.

The condition for equal, normalized power gains at $N=5$ is:

$$\frac{\left|\sum_{k=1}^{5} W_k e^{j 4\pi\phi T_k}\right|^2}{\sum_{k=1}^{5} |W_k|^2} = \frac{\left|\sum_{k=1}^{5} V_k e^{k 4\pi\phi T_k}\right|^2}{\sum_{k=1}^{5} |V_k|^2}, \tag{32}$$

and the orthogonality equation is:

$$\sum_{k=1}^{5} W_k V_k^* = 0. \tag{33}$$

By initially assuming real filter tap weights as in the fixed PRF example given above, it is possible, after some algebraic manipulation, to combine equations (29) to (33) for both $W_k$ and $V_k$ into a single fourth order polynomial in one of the filter weights (e.g. $W_5$). Note that the order of the polynomial obtained from combining the above equations is always fourth order, regardless of the choice of N.

In examples of interest, it is found that the aforementioned polynomial yields two real roots and a pair of complex conjugate roots. Accordingly, the real roots yield a single pair of MTI filters with real filter tap weights, analogously to the fixed PRF example described hereabove, and the complex roots yield a pair of orthogonal MTI filters with complex conjugate weights.

A specific example for the case of a burst of five pulses having a sequence of four interpulse periods in the ratios 3:4:5:3 will now be described. The predetermined frequency response zeros of the filter response may be taken at zero frequency and ±0.05 times the average PRF (i.e. reciprocal of the average interpulse). The responses may be equalized at 0.1 times the average PRF.

Examples of two, orthogonal, normalized, real-tap weight sets are:

| | | | |
|---|---|---|---|
| $W_1 =$ | 0.395185 | $V_1 =$ | 0.114577 |
| $W_2 =$ | −0.791966 | $V_2 =$ | 0.006459 |
| $W_3 =$ | 0.417519 | $V_3 =$ | −0.491257 |
| $W_4 =$ | 0.134686 | $V_4 =$ | 0.766903 |

$W_5 = -0.155424$      $V_5 = -0.396682$

Figure 6:
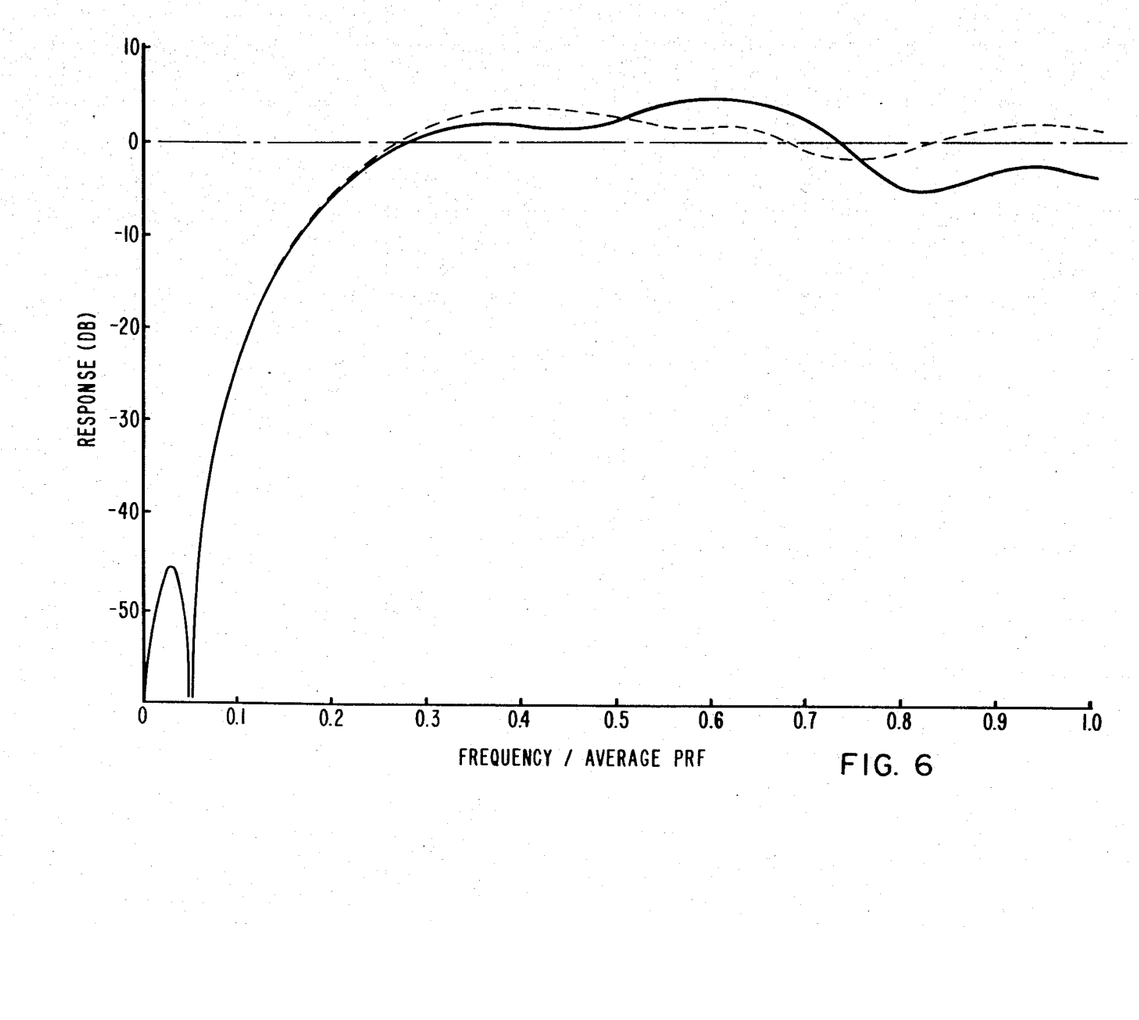
FIG. 6 is a graph exemplifying the power responses of two different five-pulse variable interpulse period orthogonal filters having real tap weights.

The corresponding velocity (frequency) responses are exemplified in the graph of FIG. 6 over the range from zero frequency to the average PRF. Since the peak responses occur at different frequencies it is apparent that the two different MTI filters tend to complement each other. That is, their composite responses as a result of post detection integration, combine to provide a flatter response than either of them individually, and also flatter than would be provided by the conventional N-pulse single MTI filter.

An example of a corresponding, orthogonal, complex conjugate set of filter tap weights are:
$W_1 = 0.290946 + j\ 0.0$
$W_2 = -0.536583 - j\ 0.160327$
$W_3 = 0.186823 + j\ 0.415842$
$W_4 = 0.242477 - j\ 0.494313$
$W_5 = 0.183662 + j\ 0.238798$,
where $V_k = W_k^*$, for $k = 1$ through 5.

Figure 7:
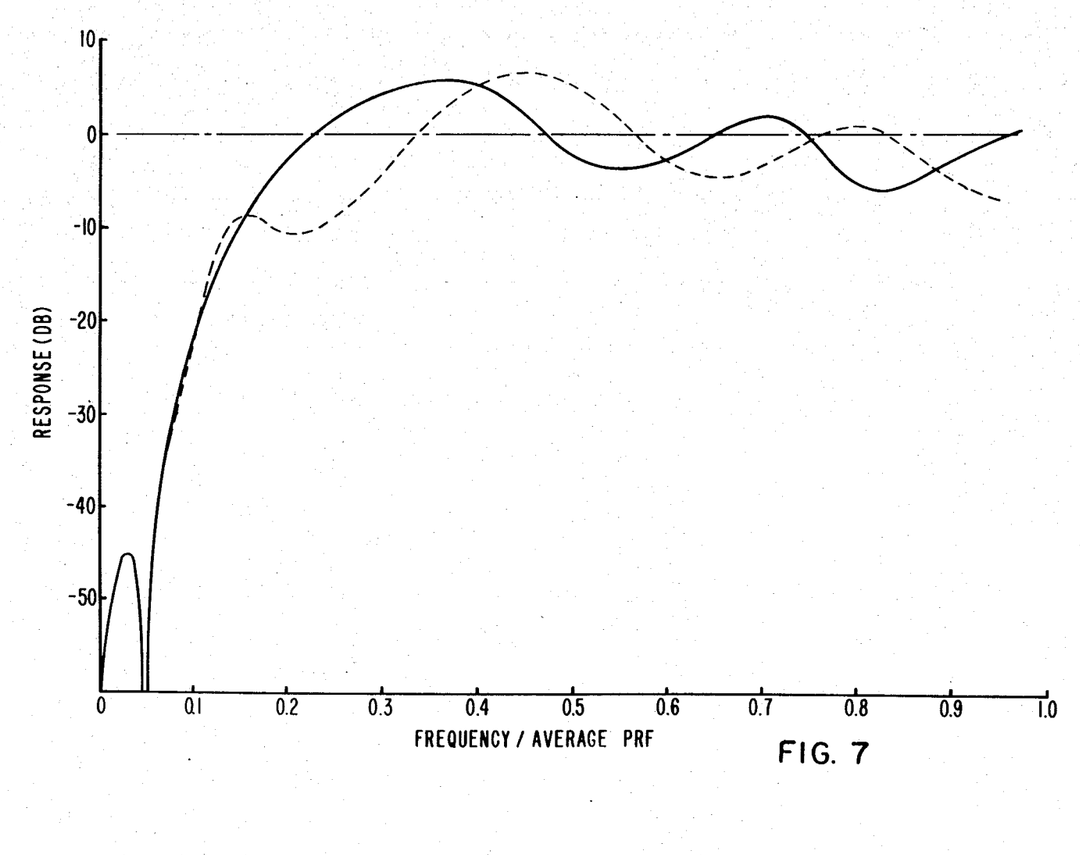
FIG. 7 is a graph exemplifying the power responses of two different five-pulse variable interpulse period orthogonal filters with complex tap weights.

The corresponding frequency responses of the two MTI filters for the above set of filter tap weights are depicted in the graph of FIG. 7. Note that because of the complex filter tap weights, these two responses are no longer symmetric about zero frequency. Nevertheless, the two responses exhibit the useful property that they complement each other by providing a flattening of the composite response after post detection integration.

Figure 8:
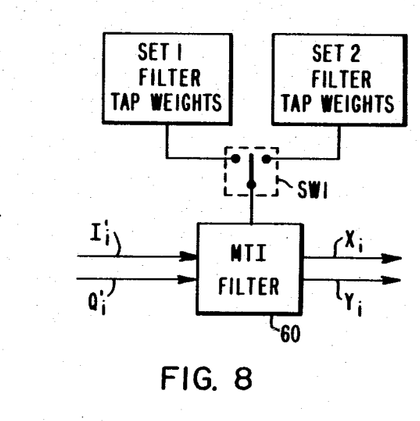
FIG. 8 is a block diagram schematic exemplifying an alternate embodiment of one aspect of the present invention.

The principles of the present invention have been described in connection with the functional block diagram schematic described in connection with FIG. 4. It is evident that two separate MTI filters operative in parallel to process an N+1 pulse echo signal burst may be used in a practical implementation thereof. However, the broad scope of applicant's invention should not be limited to such an embodiment because other alternative embodiments are capable of operating functionally in a similar manner. For example, an embodiment including one MTI filter operative in a time-shared fashion between two different orthogonal MTI filter characteristics manifests the effect of a parallel operation of two filters to process an N+1 pulse echo signal burst. An example of such an embodiment is shown by the block diagram schematic in FIG. 8 depicting a single MTI filter 60. The filter 60 may be operated in a time-shared manner utilizing a functional switch SW1 which operates to provide the single filter 60 with set 1 of filter tap weights during one time interval of operation and set 2 of filter tap weights going another time interval of operation. In addition, it is possible to have the single MTI processor operating at twice the supply rate of the input data $I'_i$ and $Q'_i$ so that the complete time interval of the time-shared operation will be commensurate with the parallel operated functional embodiment of two separate MTI filters as exemplified by the block diagram schematic of FIG. 4.

While the principles of the present invention have been described in connection with particular embodiments with an analysis for determining the filter tap weights and frequency response zeros in each case, it is understood that additions and modifications may be made to the particular embodiments and alternate analysis techniques may be used to determine the filter tap weights and frequency response zeros thereof without deviating from the present invention. Thus, the invention should not be limited to any one embodiment or analysis scheme, but rather construed in broad scope and breadth according to the recitation of the appended claims.

What is claimed is:

1. In a radar operating in a moving target indication (MTI) mode with frequency diversity by transmitting N+1 pulse bursts and receiving echo signalling therefrom, each pulse of the same burst enveloping a fixed carrier frequency, said radar operative to change the transmitted carrier frequency from one pulse burst to another, a radar channel for doppler processing said received N+1 pulse echo signal bursts comprising:

filtering means operative as two different MTI filters having mutually orthogonal tap weights, each having a frequency response similar to an N-pulse MTI filter, to process functionally in parallel a received N+1 pulse echo signal burst to generate a filter signal from each functional filter; and     means for combining said two filtered signals noncoherently to generate a composite signal corresponding to said N+1 pulse echo signal burst for target detection.

2. The radar channel in accordance with claim 1 wherein the filtering means includes two functionally operative filters having frequency response characteristics substantially similar to each other for target echo signals, but which effect uncorrelated noise output signals corresponding to a common N+1 pulse echo signal burst.

3. The radar channel in accordance with claim 2 wherein the filtering means includes two functionally operative N+1 pulse weighted canceller filters, each operative with a frequency response characteristic similar to an N-pulse weighted canceller filter.

4. The radar channel in accordance with claim 3 wherein each functionally operative N+1 pulse weighted canceller filter includes a set of tap weights having values which effect the uncorrelated noise outputs of the two filters.

5. The radar channel in accordance with claim 4 wherein the sets of filter tap weights have all real values.

6. The radar channel in accordance with claim 4 wherein the sets of filter tap weights have all complex values.

7. The radar channel in accordance with claim 3 wherein the functionally operative N+1 pulse weighted canceller filters each include a set of tap weights $W_k$ and $V_k$, respectively, for $k = 1$ to $N+1$, which have determined values in accordance with conditions including an orthogonality condition which may be expressed as:

$$\sum_{k=1}^{N+1} W_k V_k^* = 0.$$

8. The radar channel in accordance with claim 1 wherein the filtering means includes two MTI filters operative in parallel to process an N+1 pulse echo signal burst.

9. The radar channel in accordance with claim 1 wherein the filtering means includes one MTI filter operative in a time-shared fashion between two different orthogonal MTI filter characteristics manifesting the effect of a parallel operation of said two filters to process an N+1 pulse echo signal burst.

10. The radar channel in accordance with claim 1 wherein the radar is operative to transmit an N+1 pulse burst with a fixed pulse repetition rate; wherein the filtering means includes means operative as two different N+1 pulse weighted cancellers to process functionally in parallel the received N+1 pulse echo signal burst to generate two filter signals therefrom, each canceller having a sampled-data signal response including one non-zero valued Z-transform zero with corresponding non-zero values of the two cancellers being different valued; and wherein each canceller is operative with a set of filter tap weights which are non-identical to the other canceller's set.

11. The radar channel in accordance with claim 10 wherein the sets of tap weights of the two cancellers are all real.

12. The radar channel in accordance with claim 11 wherein the sets of tap weight values of the two cancellers are in reverse order to each other.

13. The radar channel in accordance with claim 10 wherein the sets of tap weights of the two cancellers are all complex.

14. The radar channel in accordance with claim 1 wherein the radar is operative to transmit an N+1 pulse burst with variable interpulse periods; wherein the filtering means includes means operative as two different N+1 pulse weighted cancellers to process functionally in parallel the received N+1 pulse echo signal burst to generate two filter signals therefrom, each canceller having a sampled-data signal response including at last one non-zero valued frequency response zero, said one non-zero valued zero of one canceller being different in value from the corresponding non-zero valued zero of the other canceller; and wherein each canceller is operative with a set of filter tap weights are non-identical to the other canceller's set.

15. The radar channel in accordance with claim 14 wherein the sets of tap weights of the two cancellers are all real.

16. The radar channel in accordance with claim 14 wherein the sets of tap weights of the two cancellers are all complex.

17. The radar channel in accordance with claim 16 wherein the set of tap weights of one canceller are correspondingly the complex conjugate of the set of tap weights of the other canceller.

18. The radar channel in accordance with claim 1 wherein the combining means includes:
- an amplitude detector for deriving the amplitudes of the two filtered signals generated by the filter means; and
- a post detection integrator for integrating the amplitudes of the two filtered signals to generate the composite signal.

* * * * *